United States Patent [19]

Lucchesi

[11] Patent Number: 4,504,701
[45] Date of Patent: Mar. 12, 1985

[54] TELEPHONE HAVING CIRCUITRY FOR REDUCING THE AUDIO OUTPUT OF THE RINGING SIGNAL

[75] Inventor: Armand P. Lucchesi, Jersey City, N.J.

[73] Assignee: J. C. Penney Company, Inc., New York, N.Y.

[21] Appl. No.: 551,486

[22] Filed: Nov. 14, 1983

[51] Int. Cl.³ .............................................. H04M 1/00
[52] U.S. Cl. ................................. 179/84 T; 179/81 R
[58] Field of Search ................. 179/81 R, 84 T, 84 A, 179/84 R, 167, 168, 159, 103, 2 EA, 84 C; 381/72

[56] References Cited

U.S. PATENT DOCUMENTS

| | | | |
|---|---|---|---|
| 379,074 | 3/1888 | Lambdin | 179/159 |
| 2,140,655 | 12/1938 | Sloan | 179/2 |
| 2,686,844 | 8/1954 | Brewer | 179/159 |
| 3,011,040 | 11/1961 | DeRemer et al. | 200/152 |
| 3,365,554 | 1/1968 | Breyzinski | 179/168 |
| 3,683,130 | 8/1972 | Kahn | 179/156 |
| 4,251,694 | 2/1981 | Taylor | 179/84 T |

FOREIGN PATENT DOCUMENTS 0063672 1/1982 European Pat. Off. .

OTHER PUBLICATIONS

"Cordless Telephones", *Consumer Reports*, Sep. 1983, pp. 447 to 451.

*Primary Examiner*—Gene Z. Rubinson
*Assistant Examiner*—James L. Dwyer
*Attorney, Agent, or Firm*—Daniel N. Calder

[57] ABSTRACT

In a telephone of the type wherein the receiver emits both voice and ringing signals, a gravity switch is electrically connected in parallel to a resistor, and such parallel connected elements are coupled between the ringing circuitry of the telephone and the receiver. Both the receiver and the gravity switch are housed within the telephone handset. When the handset is in its normal position the gravity switch provides a conductive path for the ringing signal from the ringing circuitry to the receiver. However, when the handset is tiltably displaced from its normal position, the conductive path through the gravity switch is broken, thereby causing the ringing signal to traverse the resistor. Passage of the ringing signal through the resistor results in the attenuation of this signal. Thus, when the handset or gravity switch is in its normal position, the receiver emits an audible ringing signal at a predetermined maximum decibel level. However, when the handset is tiltably displaced from its normal orientation, the receiver admits an audible ringing signal of lower decibel level.

14 Claims, 3 Drawing Figures

TELEPHONE HAVING CIRCUITRY FOR REDUCING THE AUDIO OUTPUT OF THE RINGING SIGNAL

BACKGROUND OF THE INVENTION

This invention relates to telephones in general and in particular to telephones having a receiver that is driven by either voice signals or ringing signals. More specifically, this invention relates to such a telephone having circuitry for attenuating the ringing signal when the telephone handset is displaced from a preselected position.

In recent years, we have witnessed the introduction of what is commonly referred to as the "cordless" telephone. These telephones are found in both the home and business. The cordless telephone is usually a two-piece apparatus; a base station and a cord-free, battery-powered handset that communicate with each other by transmitting and receiving signals through antennas. A typical cordless telephone uses the base station house wiring to radiate a low-frequency signal to the handset. Transmissions from the handset to the base are typically made at a much higher frequency. However, there are some cordless telephones which use the higher frequency for all transmissions. Furthermore, cordless telephones are generally of two types. In a first type, the handset has no keypad, and only the voice communications are radio linked between the base station and handset. In this first type of cordless telephone, the keypad is on the base station. The other type of cordless telephone has the keypad on the handset and all the normal functions of a telephone are linked to the base station.

In many cordless telephones the receiver doubles in its function and receives both transmitted voice signals and ringing signals. Thus, we not only hear the voice of the caller through the receiver, but it also replaces the conventional electromechanical bell as the ringing signal is now transmitted from the receiver. The receiver is basically an electromagnetic transducer which is capable of converting a varying electrical signal, i.e., voice signals or ringing signals, into variations in air pressure usable by the human ear.

A problem that frequently occurs as a result of the dual function of the receiver is referred to herein as "acoustical shock." On many cordless telephones a "talk" switch, which is found on the handset, must be operated in order to place the handset on-line making it ready for use. Acoustical shock occurs when the receiver is put to the users ear before operating the talk switch and upon a ringing signal being emitted from the receiver. Under these circumstances the user can be subjected to a sound that measures more than 100 decibels (dB).

This problem of acoustical shock can also occur in some one-piece telephone units which are picked up from their cradle, or from a surface without allowing their hookswitch to function.

It is the general objective of the present invention to provide a telephone which prevents the user from being subjected to acoustical shock as described above.

More specifically, it is the object of this invention to prevent the problem of acoustical shock by disposing between the telephone ringing circuitry and the receiver, a gravity switch in parallel connection with a resistive means. In combination, these elements reduce the sound level of the ringing signal upon the chance happening that the receiver is emitting a ringing signal when the receiver is placed near the user's ear.

Gravity or position-sensitive switches have been used in connection with telephones as shown in U.S. Pat. No. 379,074, "Electrical Contact Maker and Breaker," to C. Lambin; U.S. Pat. No. 2,140,655, "Radio Control Device," to C. J. Sloan; U.S. Pat. No. 3,365,554, "Prevention Of Dialing By A Telephone Switchhook," to A. M. Breyzinski; U.S. Pat. No. 3,683,103, "Headset With Circuit Control," to L. R. Kahn; and European Patent Application No. 0063672, "Telephone Music Device," to R. K. L. Tang, et al.

BRIEF DESCRIPTION OF THE INVENTION

The telephone of the present invention includes a receiver disposed in the telephone handset and adapted for receiving either a speech signal or a ringing signal and being activated or driven by such signal. Further provided in the telephone is ringing circuitry for processing a ringing signal and an audio amplifier adapted for amplifying the ringing signal. Moreover, resistive means, such as a resistor, are coupled to an output of the ringing circuitry and an input of the audio amplifier. A gravity or a position-sensitive switch is electrically connected in parallel to the resistive means. The gravity switch is fixed within the housing of the telephone handset.

The gravity switch will provide the ringing signal with a conducting path to the audio amplifier when the gravity switch is disposed in a preselected position. This preselected position occur when the handset is cradled in the base station of the telephone. Upon the handset, and thus the gravity switch, being tiltably displaced from its preselected position, the conducting path through the gravity switch is broken thereby, necessitating transmission of the ringing signal through the resistive means which attenuates, to a predetermined level, the ringing signal. Thus, if the user had not operated the telephone "talk" switch prior to placing the receiver to his ear, and if as the receiver is placed to the ear a ringing signal is emitted from the receiver, the resistive means will have sufficiently reduced the ringing signal level to prevent acoustical shock.

BRIEF DESCRIPTION OF THE DRAWINGS

Various objects, features, and attendant advantages of the present invention will be more fully appreciated as the same becomes better understood from the following detailed description of the present invention when considered in connection with the accompanying drawings, in which.

DETAILED DESCRIPTION OF THE PRESENT INVENTION

Figure 1:
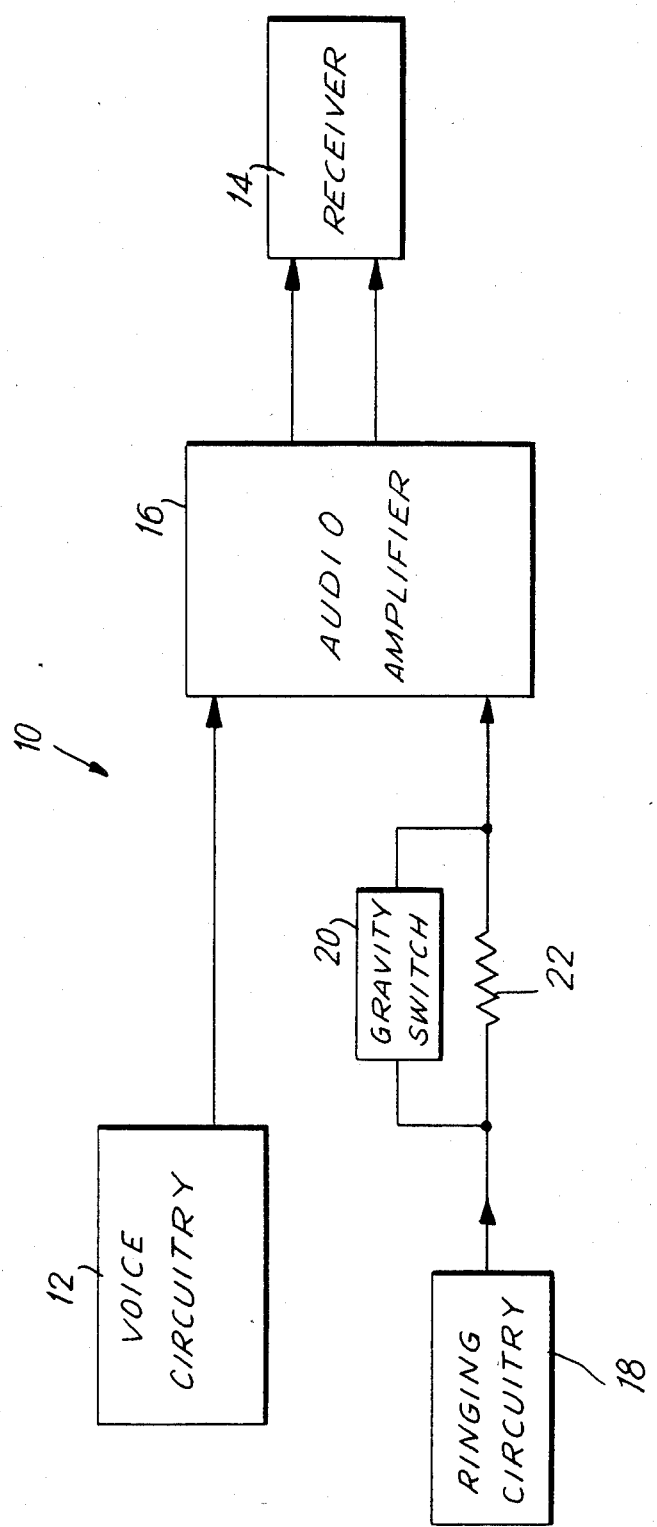
FIG. 1 is a block diagram of the telephone circuitry according to the present invention.
Figure 2:
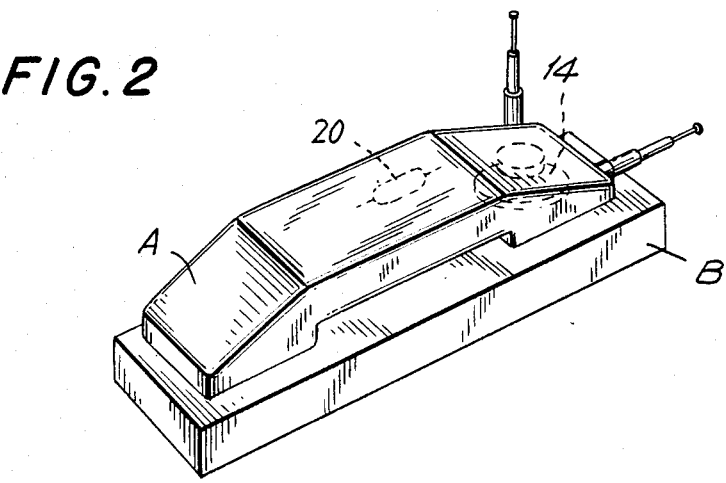
FIG. 2 is a perspective view of the telephone of the present invention wherein the telephone handset is cradled in the telephone base.
Figure 3:
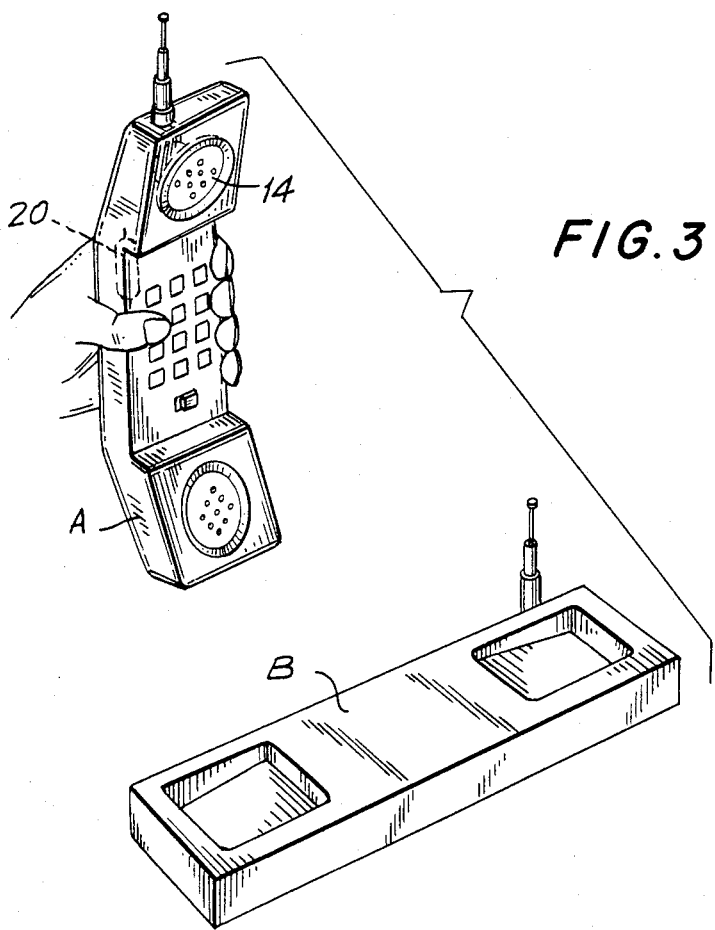
FIG. 3 is a perspective view of the telephone of FIG. 2 wherein the handset has been tiltably displaced in an upright manner from its position in the base station.

Referring now to the drawings, wherein like reference numerals represent identical or corresponding parts throughout the several views, and more particularly to FIG. 1 thereof, the telephone circuitry of the present invention is indicated generally by reference numeral 10. Telephone circuitry 10 incorporates voice circuitry 12 which is conventional circuitry for processing voice signals transmitted to a telephone receiver 14. The receiver 14 is disposed, in a conventional manner in a telephone handset A as shown in FIGS. 2 and 3. Moreover, receiver 14 is of a standard type or receiver found in "electronic" telephones. Essentially it is a loudspeaker, i.e., an electromagnetic transducer capable of converting a varying electrical signal representing a transmitted voice or ringing signal into variations in air pressure usable by the human ear. A typically electromagnetic transducer consists of a coil of many turns of fine wire wound on a structure that drives a diaphram. The coil structure is suspended within a strong magnetic field.

Prior to the processed speech signal being received by receiver 14, it is amplified by a conventional audio amplifier 16.

As earlier stated, receiver 14 is also capable of receiving and being driven by a ringing signal. This, of course, is the signal by which the called party is advised that a call is waiting. In the present invention the ringing signal is processed by conventional ringing circuitry 18. As with respect to the processed voice signal, the processed ringing signal is also amplified by the audio amplifier 16.

Unique, however, to the present invention is a gravity switch 20 in parallel connection with a resistive means 22. The combinations of these parallel connected elements is electrically coupled to the output of the ringing circuitry 18 and the input of audio amplifier 16. Typically, the resistive means 22 is a resistor of a preselected value, and the gravity switch 20 is a mercury switch whose relative orientation determines if it is in an "open" or "closed" mode. In the present invention, the gravity switch 20 is securely mounted within the housing of telephone handset A as shown in FIGS. 2 and 3. It is anticipated that for efficiency of operation, the voice circuitry 12, ringing circuitry 18, audio amplifier 16 and resistive means 22 will be housed within the handset A.

Referring to FIGS. 2 and 3, in the operation of the telephone of the present invention, when the telephone handset A is cradled in a telephone base station B, gravity switch 20 is in its normal position and is in the "closed" mode. Thus, it provides a conductive path between ringing circuitry 18 and audio amplifier 16 and effectively "shorts-out" resistive means 22. Accordingly, the output ringing signal from ringing circuitry 18 is substantially at its full strength when received by audio amplifier 16. Under these operating conditions, the audible ringing signal emitted by receiver 14 will be at its maximum level, over 100 decibels (dB).

When the telephone user proceeds to answer a telephone call and removes handset A from its preselected position in the cradle of base station B, gravity switch 20 is tiltably displaced from its normal position a predetermined degree causing it to become electrically "open." Thus, the ringing signal is no longer provided with a conducting path through gravity switch 20 but instead must traverse resistor 22 as it travels to audio amplifier 16. Resistor 22 will attenuate the ringing signal in proportion to its resistance, and such attenuation will result in a lowering of the sound level of the audible ringing signal emitted from receiver 14. Accordingly, even if a user forgets to operate the talk switch, he would not be subjected to acoustical shock when the receiver was placed against his ear.

The resistive value of resistor 22 can be calculated by conventional means depending on the various elements of ringing circuitry 18 and audio amplifier 16. However, the resistance of resistor 22 should be such that the attenuated ringing signal emitted from receiver 14 is below a sound level that could cause pain to the human ear if receiver 14 comes in close proximity to the ear. Typically, an audible ringing signal of about 75 decibels (dB) or less as emitted from receiver 14 would not be painful if emitted in close proximity to the ear.

The degree of displacement required for changing the gravity switch 20 from its closed mode to its open mode, and vice versa, is not critical as long as the change does occur prior to placing the handset in a generally vertical position, i.e., the position it would be in when the handset A is bought next to the ear. Generally, however, the handset A should not have to be tiltably displaced more than 30 degrees from its normal position, which is typically horizontal in orientation, in order to cause the gravity switch 20 to break its conductive path.

Obviously, numerous modifications and variations of the present invention are possible in light of the above teachings. It is therefore to be understood that within the scope of the appended claims, the invention may be practiced otherwise, then as specifically described herein.

What is claimed is:

1. A telephone of the type having a receiver being adapted for receiving a ringing signal and being activated thereby, comprising:
   ringing circuitry for processing a ringing signal;
   amplifying means adapted for amplifying a processed ringing signal, said amplified ringing signal being received by said receiver;
   resistive means coupled to an output of said ringing circuitry and an input of said amplifying means;
   a gravity switch electrically connected in parallel to said resistive means, said gravity switch providing a ringing signal with a conducting path to said amplifying means upon said gravity switch being in a preselected position, upon said switch being tiltably displaced a predetermined degree from its preselected position said conducting path being broken and thereby necessitating transmission of said ringing signal to said amplifying means through said resistive means which attenuates, to a predetermined level, said ringing signal.

2. The telephone as recited in claim 1, wherein said gravity switch is a mercury switch.

3. The telephone as recited in claim 1, wherein said receiver, said resistive means and said gravity switch are disposed in a handset of said telephone.

4. The telephone as recited in claim 3, wherein said amplifying means and said ringing circuitry are disposed in said telephone handset.

5. The telephone as recited in claim 3, wherein said gravity switch is in said preselected position when said telephone handset is generally horizontally oriented.

6. The telephone as recited in claim 5, wherein said handset must be tiltably displaced thirty (30) degrees or more from its preselected horizontal orientation in order to cause the gravity switch to break its conductive path.

7. The telephone as recited in claim 1, further comprising voice circuitry for processing voice signals.

8. The telephone as recited in claim 7, wherein said receiver is coupled to said voice circuitry and further adapted for receiving and being activated by a voice signal.

9. The telephone as recited in claim 1, wherein said resistive means is a resistor.

10. In a telephone of the type having a receiver activated by either a voice signal or a ringing signal, and further having an amplifying means for amplifying voice and ringing signals transmitted to said receiver, voice circuitry for processing voice signals transmitted to said amplifying means, and ringing circuitry for processing ringing signals transmitted to said amplifying means, the improvement comprising:

resistive means electrically connected in parallel to a position-sensitive switch, said parallel connected resistive means and position-sensitive switch coupled at its input to said ringing circuitry and at its output to said amplifying means, upon said handset being in its normal position said position-sensitive switch being electrically closed to permit passage of a ringing signal therethrough and thereby substantially cancelling the effect of said resistive means on said ringing signal, upon tiltably displacing said handset a predetermined determined degree or more from its normal position, said switch being electrically opened and thereby causing said ringing signal transmitted to said amplifying means to traverse said resistive means which attenuates, to a predetermined level, said ringing signal.

11. The telephone handset as recited in claim 10, wherein said position-sensitive switch is a mercury switch.

12. The telephone handset as recited in claim 10, wherein said telephone handset is adapted to be cradled in a telephone base.

13. The telephone handset as recited in claim 10, wherein said resistive means is a resistor.

14. A telephone circuit of the type having ringing circuitry for processing a ringing signal, amplifying means adapted for amplifying a processed ringing signal, and a receiver adapted for receiving said amplified ringing signal and being activated thereby, wherein the improvement comprises:

resistive means coupled to an output of said ringing circuitry and an input of said amplifying means;

a gravity switch electrically connected in parallel to said resistive means, said gravity switch providing a ringing signal with a conducting path to said amplifying means when said gravity switch disposed in a preselected position, upon said switch being tiltably displaced a predetermined degree from its preselected position said conducting path being broken and thereby necessitating transmission of said ringing signal to said amplifying means through said resistive means which attenuates, to a predetermined level, said ringing signal.

* * * * *